Jan. 9, 1934.  F. FISCHER  1,943,065
ELECTRICAL DRIVE FOR SOUND FILM EQUIPMENTS AND THE LIKE
Filed Nov. 26, 1930
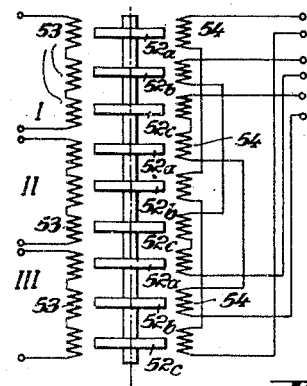
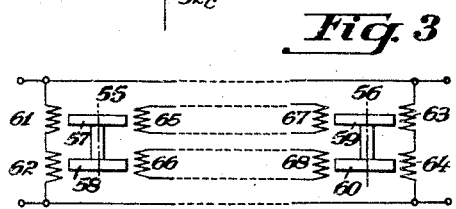
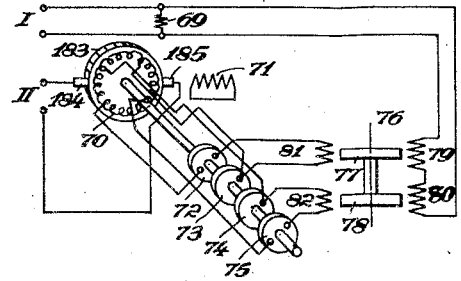
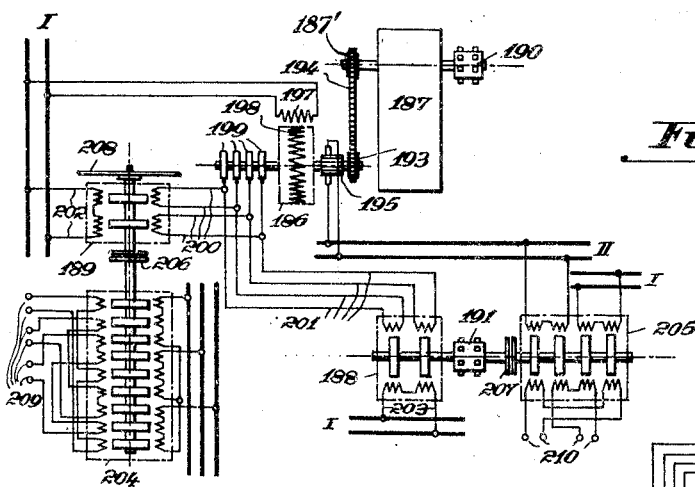
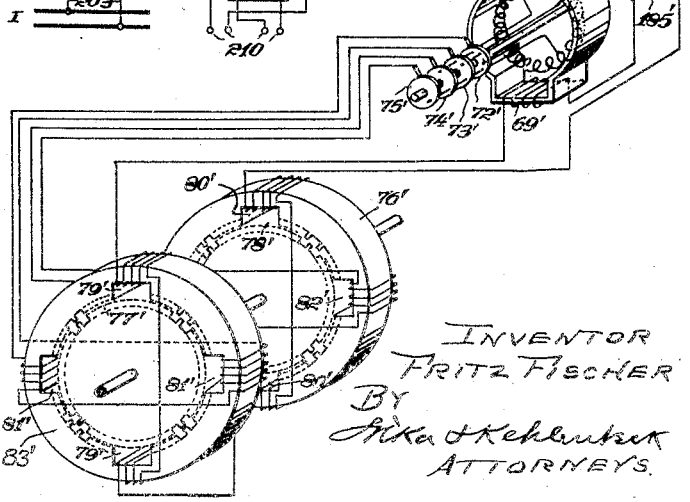
INVENTOR
FRITZ FISCHER
BY
Sika & Kehlenbeck
ATTORNEYS Patented Jan. 9, 1934

1,943,065

UNITED STATES PATENT OFFICE 1,943,065

ELECTRICAL DRIVE FOR SOUND FILM EQUIPMENTS AND THE LIKE

Fritz Fischer, Berlin-Charlottenburg, Germany, assignor to Siemens & Halske, Aktiengesellschaft, Siemensstadt, near Berlin, Germany, a corporation of Germany Application November 26, 1930, Serial No. 498,305, and in Germany November 29, 1929

8 Claims. (Cl. 172—293)

My present invention relates to means for the synchronous transmission of motion. The purpose of the invention is to provide an improved synchronous drive for a plurality of motors and to keep their rotary velocities at a predetermined constant ratio (including the case in which such velocities are kept equal), without the use of any mechanical transmitting devices. By my invention, I obtain an exceedingly quiet and even running of the machines, in contrast with the noisy and jerky operation of machines employing the customary mechanical transmission, for instance by toothed gears.

These favorable characteristics make the present invention particularly suitable for driving sound film apparatus, in which for certain reasons different velocities must be given to the individual machines, for instance the sound projector on one hand, and the picture projector, the turntable of a talking machine, or the disc recorder on the other hand. In motion picture apparatus, the use of mechanical motion-transmitting means is highly objectionable on account of the noisy and jerky operation resulting therefrom. As the invention is of especial advantage in connection with sound film apparatus, it will now be described with particular reference thereto, but it will be understood that the invention may be used with profit in other cases where a steady and noiseless operation, at a constant speed ratio, is desirable.

The invention is based on the principles laid down in my prior application Serial No. 497,967 filed in the United States Patent Office November 25, 1930. The general object of such earlier application is to produce a machine which is in operation the equivalent of a well-known rotary machine. It is particularly applicable to multipolar machines. It was the purpose of said earlier application to provide an arrangement by which machines of this type can be simplified. In the past, particularly in machines having a considerable number of poles, it has been difficult to place all the windings on the rotor and this has made such machines impracticably large and expensive.

Every synchronous or asynchronous machine has a plurality of windings the self-impedances of which therefore set up a certain number of mutual impedances.

According to the application Serial No. 497,967 machines are produced by the combination of a plurality of electrical devices, hereinafter termed component machines.

This term "component machines" as used in the present specification and claims, is to be interpreted as defining an electrical device having the following characteristics: Such device comprises a rotor carrying no windings and a stator provided with windings. The stator windings, whatever their number may be, are so arranged or connected that together they will have two self-impedances, and that there will be a resulting mutual impedance between said windings. The iron bodies of both rotor and stator are provided with teeth adapted to come into and out of registry as the rotor rotates, and when a plurality of such "component machines" are combined in accordance with my prior application, the stators of such component machines will have the same number of teeth, and the rotors of such component machines will be alike (among themselves) as to the number and pitch of their teeth. As a rule, the stator of a component machine such as are utilized to build up machines according to my prior application, has only two windings each with its own self-impedance. It is however also feasible to provide a greater number of windings on the stator, for instance four, and to connect these in such a manner that these windings together will have only two self-impedances. In this case there would be but two pairs of external terminals, and a self-impedance could be determined or measured between the two terminals of the same pair.

It is also very important that such machines built up of component machines such as defined above can be used for the synchronous transmission of motion between systems of different speed.

The present invention indicates the manner in which the principle set forth in the aforenamed application can be advantageously utilized for the drive of sound film equipments.

A new feature of the equipment described in the aforenamed application consists in that, in systems destined for the synchronous transmission of motion, the transmitter or receiver used is a normal machine, i. e. not consisting of component machines of the type defined above. This method is particularly advantageous if this machine need only have a small number of pole pairs. This, for instance, holds good for the drive of picture projectors, in which use is made of a driving motor whose speed is about 1600 revolutions per minute. For driving the feed device of film and disc records, the speeds employed are, for instance, 320 and 33⅓ revolutions per minute respectively. For motors of normal design for connection to electric mains of normal frequency, such low speeds can be obtained only with great difficulty in regard to the construction, and therefore at a high price. The present invention provides a means which permits of setting up motors for such low speeds at a moderate price.

Particularly advantageous constructional examples of the invention will now be explained more fully, with reference to the accompanying drawing, in which Figs. 1, 2 and 3 represent an asynchronous motor consisting of component machines of the type defined above and destined for connection to three-phase- or biphase mains, as well as an equipment for the synchronous transmission of motion. These three figures have been reproduced from the afore-named earlier application and are designed to explain more fully the fundamental principle of this application, Figs. 4 and 5 refer to a system for the synchronous transmission of motion, in which I use a transmitter, not consisting of component machines of the type defined above, Fig. 6 shows the drive mechanism for a sound film equipment.

The construction of a "component machine" is shown at the left in Fig. 5. The stator 83' carries two windings 81' and 79' having self-impedance so that there are in effect two self-impedances and one mutual impedance between such windings, such mutual impedance varying with a shift of the rotor. The rotor 77' carries no windings. The stator and rotor are provided with the same number of teeth. The windings divide the stator into four quadrants. The teeth on the stator are staggered in the various quadrants in such a manner that, when the teeth of the rotor are opposite the gaps on the stator in two opposite quadrants, other teeth are opposite the teeth on the stator in the remaining quadrants.

Fig. 2 shows a simple form of machine embodying the invention and intended to be the equivalent of a two-phase asynchronous motor having four windings, which, as is quite evident, will have four mutual impedances varying with the rotor shift. In this machine, four component machines are made use of so that there will be present eight self-impedance windings and four mutual impedances. The two-phase primary voltage is supplied to the left hand side of the figure, the phases being marked I and II. The stator windings 31 and 35' and their rotor 33, herein shown as an unwound type, constitute a component machine with windings 31 and 35' having self-impedance which set up a mutual impedance between such windings. In the same way, windings 32, 36 and their rotor 33; windings 34, 37 and their rotor 33; and windings 35, 38 and their rotor 33 each constitute a component machine. All the rotors 33 are mounted on a single shaft so that they rotate together, but each of such rotors is shifted by an angle of 90 electrical degrees with respect to the adjacent ones. Windings 31 and 32 having self-impedance are connected in the primary phase I and windings 34 and 35 in the other primary phase II, which is in quadrature with the first phase. The windings 35' and 38 of one of the secondary phases are connected in series and with the terminals 41, 42, while the windings 36 and 37 of the other secondary phase are likewise connected in series, their terminals being indicated at 39, 40. It will thus be noted that the component machines have their stator windings connected electrically, since each component machine has its stator windings connected to the stator windings of at least two other component machines whereby all the machines are tied together or coupled electrically, and their rotors coupled mechanically. The terminals 39, 40, 41 and 42 of the secondary phase windings 35', 36, 37 and 38 having self-impedance are connected in the same manner as the rotor windings of a two-phase asynchronous motor with bi-phase winding on the rotor. Each of the mutual impedances corresponds to one of the variable mutual impedances of a two-phase asynchronous machine. The winding 31 of the primary phase I is coupled electrically with the winding 35' of the secondary phase connected at the terminals 41, 42, while the winding 32 of said primary phase I is coupled electrically with the winding 36 of the other secondary phase, connected at the terminals 39, 40. Similarly, the winding 35 of the primary phase II is coupled electrically with the winding 38 of the first-mentioned secondary phase, while the winding 34 of said primary phase II is coupled electrically with the winding 37 of the other secondary phase. Therefore, both on the primary side and on the secondary side, there are two groups of windings (as many groups as there are phases) and each group has its windings connected in series. Each of the primary phases I and II is coupled electrically with each of the secondary phases by way of at least one of the component machines.

Fig. 3 shows a two-phase arrangement for the synchronous transmission of motion equivalent to an arrangement in which the transmitter and receiver each have a single-phase winding on the stator and a two-phase winding having two self-impedances on the rotor. Such an arrangement has two variable mutual impedances in the transmitter and two in the receiver. The transmitter 55 and the receiver 56 each consist of two component machines. In the transmitter, windings 61 and 65 together with rotor 57 and windings 62, 66 together with rotor 58; and in the receiver, windings 63 and 67 together with rotor 59 and windings 64 and 68 together with rotor 60 each constitute a component machine. The corresponding windings 61 and 62, 63 and 64; windings 65 and 67 and windings 66 and 68 are all suitably connected, the windings 61, 62 and 63, 64 being connected in series parallel arrangement to the same alternating current supply. Rotors 57, 58 and 59, 60 are each out of phase by 90° with regard to the other of the pair. The receiver 56 will operate in synchronism with the rotation of the transmitter 55. By using a different number of pole pairs in receiver and transmitter, any desired transmission of movement can be obtained with a device of this type. By using three component machines in each element, the equivalent of a three-phase synchronous system can be produced.

A machine which is equivalent to a three-phase asynchronous motor with six windings and nine variable mutual impedances is shown in Fig. 1. Such a machine comprises nine component machines. Each of the phases I, II, III of the circuit supplies current to three of the windings having self-impedance, while the other windings are supplied from a suitable source. It will be noted that the rotors may be divided into groups of three, each of such groups being provided with windings 53 fed by one of the primary phases of the circuit. The opposite or secondary phase windings 54 are divided into three groups each of such groups comprising three windings connected in series, and it will be noted that one of the windings of each group operates with a rotor of each group. In this way, the windings of the three groups are mutually interconnected so that the component machines are tied together or coupled electrically while the rotors are coupled to one another mechanically since they are mounted on a single shaft. The three rotors 52a are arranged in phase with each other, as are rotors 52b and 52c. However, rotors 52a are out of phase by 120 electrical degrees with rotors 52b, and the same relation exists between rotors 52b and 52c. In this way, each rotor is out of phase by 120 electrical degrees with each of the adjacent rotors. The windings 54 are connected in the same manner as the rotor windings of a three-phase asynchronous motor of customary construction.

Fig. 4 shows a two-phase system for the synchronous transmission of motion. It differs, however, from that shown in Fig. 3 by the fact that one part of the system is not constituted by a machine, consisting of component machines, but by a machine of the usual type, which is a unipolar machine having a single axis stator field and a closed winding 70 on the rotor. The rotor winding is tapped at four symmetrically located points, these taps being led to the slip rings 72 to 75. The other part 76 of the system is constituted, as in Fig. 3, by two component machines having the rotors 77 and 78. The windings 79 and 80 of the two component machines are series-connected and receive current from the phase I of the mains. The other windings 81 and 82 are connected through brushes to the slip rings. The single-axis stator field is produced by the exciting winding 69. At 71 I have indicated a short-circuited winding the purpose of which is to prevent the magnetic field produced by the coil 70 from being uniformly developed during the entire revolution, in cases where the stator has no well-defined poles.

Now the operation of the system, if designed for the synchronous transmission of motion, is not acted on, if the closed rotor winding 70 is connected to a collector 183, provided the brushes 184 and 185, wiping over the collector, are so arranged, that the current flowing through the brushes can no longer produce a field in the machine. In the case illustrated, the production of an additional armature field is avoided by the short-circuit winding 71.

The machine can therefore be operated as a collector motor in any connection, in which a single-axis alternating field of the machine is simulated.

The single-axis stator field of the transmitting machine is, in the case illustrated, defined by the short-circuit winding 71. It is, however, also possible to determine the axis of this field by using projecting poles. Such a case is shown in Fig. 5. In principle, this figure differs from Fig. 4 merely by this special feature. Another difference which relates however only to the manner of illustration consists in that the component machines are shown with more detail than in Fig. 4. In order to demonstrate the analogy of the two figures, the same designation numbers have been chosen in both cases for the corresponding parts. The reference numerals in Fig. 5 are distinguished by primes, but otherwise agree with those in Fig. 4. The closed rotor winding 70' of the transmitting machine is connected to the slip rings 72' to 75' and, in addition, to the collector 183'. 76' is the receiving system consisting of the two component machines. It is clearly indicated that the rotors 77' and 78' have been given the shape of unwound toothed iron parts. The windings 79', 81' and 80', 82' respectively, shifted by 90° with respect to one another, are placed in the two stators of the component machines. The winding 81' is connected to the two slip rings 72' and 73' and the winding 82' of the other machine four-pole to the slip rings 74' and 75'. The other windings 79' and 80' are connected in series with the exciting winding 69' and are consequently connected, through the brushes 184' and 185', to the same phase I of the A. C. mains, as the exciting winding contrary to the connection shown in Fig. 4, in which the armature and exciting circuits are connected to different phases of the mains. The connection indicated in Fig. 4 is, in general, preferable.

As has been mentioned before, the transmitting machine shown in Figs. 4 and 5 can without any difficulty be operated as a collector motor. Hence this system with the transmitting machine as a motor can be used to operate a working machine, and simultaneously to transmit the motion thereof, by way of electricity, synchronously to another working machine, according to the number of pole pairs, the motion being transmitted in any ratio that may be required.

Fig. 6 indicates the application of such machines and systems as have been represented in principle in the preceding figures, to the drive of sound film apparatus. 186 is the driving motor for the picture projector 187. The driving motor has been given the shape of an A. C. collector motor and its rotor is equipped with the closed winding 198. This winding is connected to the slip rings 199 at four symmetrical points, according to the examples shown in Figs. 4 and 5. The single-axis stator field is produced by the exciting winding 197 connected to the phase I of the mains. The brushes of the collectors 195 are connected to the phase II shifted by 90°. The energy transmission from the shaft 193 of the collector motor to the shaft 187' of the picture projector is effected with the aid of a rope-, chain- or belt-drive 194. Instead of this method of coupling, other coupling means may, of course, be used. The feed device for the motion picture is designated by 190.

The feed device 191 for the film record and the turn-table equipment or disc recorder 208 are set in motion by the driving machines 188 and 189 respectively. These machines are built up of component machines, in accordance with the systems shown in Figs. 4 and 5. The two driving machines 188 and 189, together with the A. C. collector motor, constitute a system for the synchronous transmission of motion. While two series-connected windings of each of the driving machines are connected to the phase I of the mains, through lines 203 and 202, the other windings of the driving machine are connected to the slip rings of the collector motor, through the lines 201 and 200. This connection permits of running the working machines 188 and 189 in perfect synchronism with the driving motor for the picture projector. The choice of suitable pole pair numbers enables any speed ratio whatever to be obtained.

The device has a perfectly smooth running, and noises, which formerly occurred when using mechanical gearings, are avoided. Very low speeds, for instance 33⅓ revolutions per minute, can be obtained for the turn-table equipment in a most economical manner.

It will be obvious that the invention is not limited to a two-phase system for the synchronous transmission of motion. If it is desirable for any reason whatever, three-phase systems may be used. The working machines must, in this case, be simulated by three component machines each.

In Fig. 6, the windings of the driving machines 188 and 189 are connected in parallel to the slip rings of the collector motor. The windings might, of course, just as well be series-connected. It is also possible to operate more than two systems in synchronism with the driving motor of the picture projector, for instance several disc recorders or turn-table equipments.

Through the couplings 206 and 207, the turn-table 208 and the feed device 191 can be coupled each with an asynchronous motor 204 and 205 respectively, of the types shown in Figs. 1 and 2 respectively. 204 is an asynchronous motor for connection to three-phase mains and 205 one for connection to two-phase mains. 209 and 210 are the coil terminals, which are in accordance with the rotor terminals of normal asynchronous motors. If, for any reason whatever, it is desirable to operate the turn-table equipment and the film record feed without the picture projector, either one or the other asynchronous motor will be used for driving. Through the lines 200 and 201, the rotation of the turn-table would be effected in synchronism with the film record feed or vice versa. Of course, it is also possible to run only one of the two systems 208 and 191 by one of the asynchronous motors. Other driving machines consisting of component machines may just as well be substituted for the asynchronous motors.

Finally mention may be made of one essential advantage of the device, which consists in that the electric connection between the collector motor and the driving machines for the sound records represents an elastic connection which prevents jerks produced by the intermittent feed of the motion picture from being transmitted to the turn-table equipment or to the film record-drive.

I claim:

1. In an electrical driving and synchronizing mechanism, a driving machine consisting of a motor provided with a collector and having substantially a single-axis alternating field, and a driven machine operating with a plurality of phases and consisting of a plurality of component machines, each component machine having as its elements a toothed coilless rotor, a toothed stator, and primary and secondary phase windings on the stator, said rotors and stators having all the same tooth pitch, the stator windings of any one of said component machines having only one primary self-impedance and only one secondary self-impedance altogether and being in such relation to each other that there will be one mutual impedance between them, the windings of the component machines being arranged and connected in series to form on the primary side as well as on the secondary side as many groups as there are phases, in such a manner that each phase on the primary side is coupled through its rotors with each phase on the secondary side, said rotors being coupled mechanically and said windings of one of the said sides being connected electrically with said driving machine.

2. In an electrical driving and synchronizing mechanism, a driving machine consisting of a motor provided with a collector and having substantially a single-axis alternating field, and a driven machine operating with a plurality of phases and consisting of a plurality of component machines, each component machine having as its elements a toothed coilless rotor, a toothed stator, and primary and secondary phase windings on the stator, said rotors and stators having all the same tooth pitch, the stator windings of any one of said component machines having only one primary self-impedance and only one secondary self-impedance altogether and being in such relation to each other that there will be one mutual impedance between them, the windings of the component machines being arranged and connected in series to form on the primary side as well as on the secondary side as many groups as there are phases, in such a manner that each phase on the primary side is coupled through its rotors with each phase on the secondary side, said rotors being coupled mechanically and said driving motor having a closed winding provided with taps at symmetrical points, slip rings connected with said taps, and means for connecting said slip rings with the windings of one of the sides of said driven machine in such a manner that the motion of the said motor will be transmitted synchronously to the driven machine.

3. In an electrical driving and synchronizing mechanism, a driving machine consisting of a motor provided with a collector and having substantially a single-axis alternating field, and a driven machine operating with a plurality of phases and consisting of a plurality of component machines, each component machine having as its elements a toothed coilless rotor, a toothed stator, and primary and secondary phase windings on the stator, said rotors and stators having all the same tooth pitch, the stator windings of any one of said component machines having only one primary self-impedance and only one secondary self-impedance altogether and being in such relation to each other that there will be one mutual impedance between them, the windings of the component machines being arranged and connected in series to form on the primary side as well as on the secondary side as many groups as there are phases, in such a manner that each phase on the primary side is coupled through its rotors with each phase on the secondary side, said rotors being coupled mechanically and said driving motor having a closed winding provided with taps at symmetrical points, slip rings connected with said taps, said motor having a number of pole pairs different from the number of pole pairs of the driven machine, and means for connecting said slip rings with the windings of one of the sides of said driven machine in such a manner that the motion of the said motor will be transmitted synchronously to the driven machine in the ratio of the respective numbers of pole pairs.

4. In an electrical driving and synchronizing mechanism, a driving machine consisting of a motor provided with a collector and having substantially a single-axis alternating field, and a driven machine operating with a plurality of phases and consisting of a plurality of component machines each comprising a coilless toothed rotor and a toothed stator provided with primary and secondary phase windings, the primary phase windings and the secondary phase windings as well forming as many groups as there are phases, the windings of the same group being connected in series, and those rotors which are associated with the windings of the same primary phase group being associated with secondary phase windings of different secondary phase groups, the rotors of the several component machines being coupled mechanically, and the stator windings being connected electrically with said driving machine.

5. In an electrical driving and synchronizing mechanism, a driving machine consisting of a motor provided with a collector and having substantially a single-axis alternating field, and a driven machine operating with a plurality of phases and consisting of a plurality of component machines each comprising a coilless toothed rotor and a toothed stator provided with primary and secondary phase windings, the primary phase windings and the secondary phase windings as well forming as many groups as there are phases, the windings of the same group being connected in series and associated with different rotors, and those rotors which are associated with the windings of the same primary phase group being associated with secondary phase windings of different secondary phase groups, the rotors of the several component machines being coupled mechanically, and the stator windings being connected electrically with said driving machine.

6. In an electrical driving and synchronizing mechanism, a driving machine consisting of a motor provided with a collector and having substantially a single-axis alternating field, and a driven machine operating with a plurality of phases and consisting of a plurality of component machines each comprising a coilless toothed rotor and a toothed stator provided with primary and secondary phase windings, the primary phase windings and the secondary phase windings as well forming as many groups as there are phases, the windings of the same group being connected in series and associated with as many different rotors as there are phases, and those rotors which are associated with the windings of the same primary phase group being associated with secondary phase windings of different secondary phase groups, the rotors of the several component machines being coupled mechanically, and the stator windings being connected electrically with said driving machine.

7. In an electrical driving and synchronizing mechanism, a driving machine consisting of a motor provided with a collector and having substantially a single-axis alternating field, and a driven machine operating with a plurality of phases and consisting of a plurality of component machines each comprising a coilless toothed rotor and a toothed stator provided with primary and secondary phase windings, the phase windings on the primary side and those on the secondary side as well forming as many groups as there are phases, the windings of the same group being connected in series, and those rotors which are associated with the windings of the same primary phase group being associated with secondary phase windings of different secondary phase groups, the rotors of the several component machines being coupled mechanically, said motor having a closed winding tapped at symmetrical points, slip rings connected with said taps and means for connecting said slip rings with the windings of one of the sides of said driven machine in such a manner that the motion of the said motor is transmitted synchronously to the driven machine.

8. In an electrical driving and synchronizing mechanism, a driving machine consisting of a motor provided with a collector and having substantially a single-axis alternating field, and a driven machine operating with a plurality of phases and consisting of a plurality of component machines each comprising a coilless toothed rotor and a toothed stator provided with primary and secondary phase windings, the phase windings on the primary side and those on the secondary side as well forming as many groups as there are phases, the windings of the same group being connected in series, and those rotors which are associated with the windings of the same primary phase group being associated with secondary phase windings of different secondary phase groups, the rotors of the several component machines being coupled mechanically, the said motor having a number of pole pairs different from the number of pole pairs of the driven machine, said motor having a closed winding tapped at symmetrical points, slip rings connected with said taps and means for connecting said slip rings with the windings of one of the sides of said driven machine in such a manner that the motion of the said motor is transmitted synchronously to the driven machine in the ratio of the respective numbers of pole pairs.

FRITZ FISCHER.